(12) United States Patent
Roberts

(10) Patent No.: US 6,354,328 B1
(45) Date of Patent: *Mar. 12, 2002

(54) METHODS AND APPARATUS FOR SLUDGE COLLECTION

(75) Inventor: R. Lee Roberts, Chadds Ford, PA (US)

(73) Assignee: RG Delaware, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/541,499

(22) Filed: Apr. 3, 2000

(51) Int. Cl.[7] .............................................. B01D 21/24
(52) U.S. Cl. ................... 137/625.41; 210/533; 210/535
(58) Field of Search .................. 137/625.31, 625.41; 210/533, 534, 535, 803

(56) References Cited

U.S. PATENT DOCUMENTS

| 299,744 | A | * | 6/1884 | Cook | 210/535 |
| 994,617 | A | * | 6/1911 | Sutro | 210/535 |
| 1,547,861 | A | * | 7/1925 | Davis | 210/535 |
| 5,143,623 | A | * | 9/1992 | Kroll | 210/535 X |
| 5,911,241 | A | * | 6/1999 | Roberts | 137/625.11 |

OTHER PUBLICATIONS

"Continuous Sludge Collection" dated Jan. 15, 1925.

* cited by examiner

Primary Examiner—John Rivell
(74) Attorney, Agent, or Firm—Merek & Voorhees

(57) ABSTRACT

Sludge collection and removal systems are disclosed. The present invention provides methods and apparatus that include piping system of headers and laterals selectively provided with flow from a central point so that sludge can be removed from areas where it accumulates most rapidly. The adaptable nature of the piping system additionally permits the number of collection laterals and orifices to be varied to suit the sludge accumulation characteristics of the sludge basin. Additionally, improved multiple port valves are disclosed that permit the selective connection of the flow among sections in preferred embodiments of the sludge collection systems.

12 Claims, 6 Drawing Sheets

METHODS AND APPARATUS FOR SLUDGE COLLECTION

The present invention is directed to methods and apparatus for removing sludge byproducts that are created by water filtration processes from settling basins and tanks commonly found in water and wastewater treatment plants.

BACKGROUND OF THE INVENTION

The settling basins in water and wastewater treatment plants are typically circular or rectangular concrete structures that have sloped bottoms that collect and store sludge. The basins are periodically drained and the sludge that has accumulated is flushed out through drains in the basin floor. Removal of the accumulated sludge is an important part of the overall treatment process, particularly since anaerobic bacterial activity may develop in the collected sludge over time. Therefore, in an ideal situation, the sludge is drained or removed without disturbing the material through excavation or manual removal. Moreover, it is further desirable from a cost and efficiency standpoint to be able to effectively remove the sludge from the basin when accumulation requires its removal.

Methods of removing sludge on a more or less continuous basis have been developed in an effort to reduce the need to completely drain and flush the basin. Techniques such as header and lateral piping systems, scraper mechanisms and vacuum or suction removal systems have been tried, without complete success.

Sludge removal systems are known where a moving apparatus is directed across the floor of the basin to remove the sludge in its path. The unit can be guided by rails and may use static head or eduction to remove the sludge. In some variations, the sludge collection basin is cone-shaped and the sludge collection apparatus moves along a circular or spiral path over the surface of the cone. Such systems are cumbersome and expensive and require a complex system of moving parts and precision machinery prone to breakdown in the gritty environment of a sludge bed.

In other systems, the inherent problems of moving equipment are avoided by providing a series of fixed pipes to remove the sludge. The pipes are selected so that a number of perforated pipes of small diameter are connected to larger diameter pipes, which are in turn connected to a lesser number of larger diameter pipes, and so on, until ultimately, the piping "tree" meets at a single header pipe of relatively large diameter that is controlled by a single collection valve. The single valve is opened to flush sludge into drains by means of the static head of water in the basin. In order for fixed grid sludge collection systems to collect evenly, it is critical that the flow capacity of the grid be compatible with the flow capacity of the downstream piping including the header, valve and basin outlet. Therefore, it is necessary to either use a very large valve and basin outlet in combination with a grid covering the entire basin or to use multiple valves and basin outlets in combination with smaller grids.

Another limitation to fixed sludge collection systems is that sludge is often not efficiently removed because the water in the basin tends to flow around the sludge and into the collection system. Typically, sludge may flow into the collection system when the valve first opens, creating a hole or depression in the sludge. This depression is known as a "rat hole." Once this depression exposes the collection orifice, water enters the collection system rather than sludge. Fixed collection systems that have valves open for extended periods of time usually collect more water than sludge. The tendency toward "rat holing" is dependent upon certain characteristics of the sludge such as its composition, concentration, viscosity, and compressibility. Sludge found in water treatment processes may have different compositions, varying amounts of suspended solids, and therefore different characteristics. For example, alum sludge will have different characteristics than ferric sludge or lime sludge.

A limitation to systems using single large outlets is that the system must be operated to remove sludge from the entire basin as soon as one area exhibits significant sludge accumulation. This type of operation is inherently inefficient and either wastes water unnecessarily or allows sludge to accumulate more heavily than is optimal for the process. A limitation to systems using the multiple basin outlets is the expense of the outlets and the difficulty in retrofitting the basin.

Finally, sludge removal is also sometimes attempted by providing systems that float and skim the sludge from the water overlying the bottom of the basin. However, such systems are inefficient, expensive and require complex systems of piping and suction, the latter of which are prone to breakdown since a gritty slurry of sludge and water must be skimmed and pumped.

Additionally, all of the known systems discussed above are difficult if not impossible to retrofit into existing sludge collection basins.

Therefore, it would be desirable to provide a sludge collection, system that is simple and reliable, while still effectively removing sludge. Additionally, it would be desirable to permit the amount of removal applied to various areas of the bed to be adjusted or varied based upon sludge accumulation patterns. Finally, such a system would ideally be adaptable for both new construction and retrofit applications.

SUMMARY OF THE INVENTION

The present invention provides a sludge collection system that is comprised of a manifold having a plurality of manifold inlets and a manifold outlet, a plurality of collection laterals, for collecting sludge, that are in fluid communication with the manifold by way of the manifold inlets, a drain, in fluid communication with the manifold outlet for removing sludge from the manifold, and one or more collection valves that selectively permit flow of sludge from the collection laterals through the manifold inlets and through the manifold.

The specialized piping of the sludge collection system of the present invention provides improved hydraulic characteristics. One advantage of the sludge collection system disclosed is that the performance of the system can be regulated and adjusted to meet the requirements of the filtration system. Another advantage of this invention is the ability to effectively remove sludge through smaller or fewer basin outlets than conventional fixed grid designs. The disclosed system is thereby more cost effective for retrofitting into existing basins.

The present invention uses the static head of the water in the basin to push sludge and water into a sludge collection grid, through a valve, through main drain piping and out of the basin. Each sludge collection basin is divided into a number of collection zones, and each zone may be sized and independently operated to allow the hydraulic characteristics of the system to be optimized. Optimization is preferably obtained by matching the flow rates of each zone to the capacity of the piping system used to remove the sludge from the basin.

The flow rate from each zone is dependent on the available static head and the diameter and number of the orifices in the zone. The flow rate can be optimized by varying the diameter and/or the number of orifices in the collection grid. In addition, the laterals may be spaced at varying pitches to provide further flexibility. The zones allow the system to provide the required amount of removal capacity in each area of the basin. In most basins, sludge tends to collect more rapidly in one area, and the removal capacity of each zone is thus preferably tailored to the anticipated sludge accumulation rate. The spacing of the orifices and the laterals can also be optimized for the collection of various types of sludge in order to reduce the effect of "rat holing." As a result, the present invention is more cost effective and efficient than previous systems.

In a preferred embodiment, the sludge collection system of the present invention comprises one or more header and lateral piping systems installed on the bottom of the basin that together create a sludge grid disposed within a zone. The header piping from each zone is connected to a valve and the valve selectively allows water and sludge from one or more selected sections to flow into a main drain pipe, and out of the basin for further processing. For example, the collected sludge can then be transferred to a holding tank or clarifier. The sludge may then be dewatered by one of several available methods and the supernatant returned to the head of the plant or otherwise carried away.

In various preferred embodiments, the sludge collection system of the present invention can be provided with either automated or manual controls. These controls preferably allow the operator to control the frequency and the duration of the operation of the valves within each zone independent of the other zones. In this manner, sludge can be removed from a particular zone or zones as necessary. The optimal frequency of withdrawal is dependent on site specific factors such as the condition of the raw water, chemical feeds, sludge characteristics, and the plant's capacity to handle concentrated sludge and unfinished water.

DETAILED DESCRIPTION OF THE PREFERRED EMBODIMENTS

Figure 1:
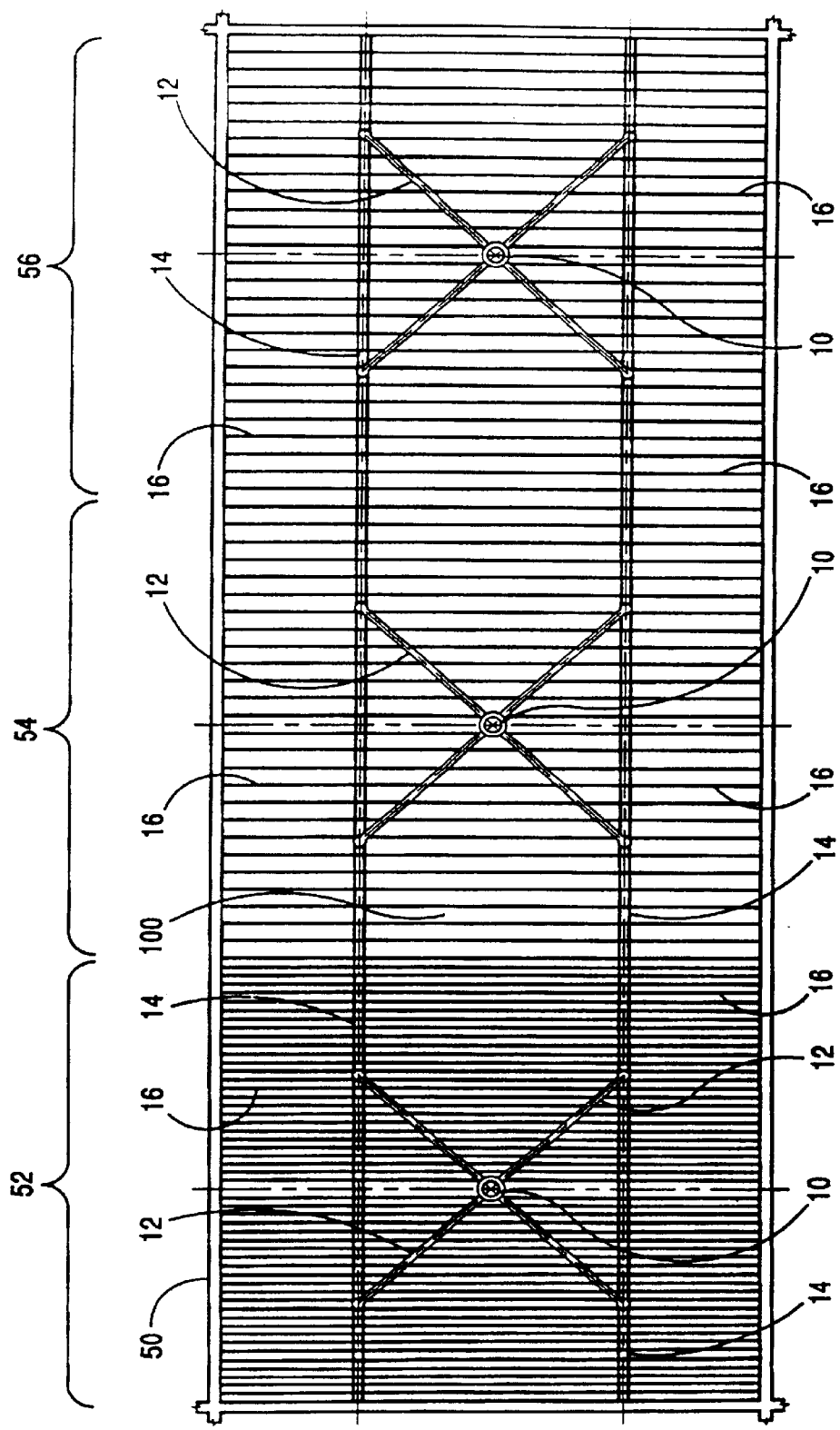
FIG. 1 is a plan view of an embodiment of a sludge basin and a sludge collection system made in accordance with the present invention.

Referring now to FIG. 1, a plan-view of a sludge collection system 100 made in accordance with the present invention is illustrated. It will be understood that the embodiment shown in FIG. 1 is a representative installation and that the present invention is by its nature, modular, flexible and adaptable to a variety of sludge collection basins, both existing and those under construction. In FIG. 1, the sludge basin 50 is rectangular and is divided into three equal zones 52,54,56 along its length. In other embodiments, as explained below, the zones need not be equal, or arrayed along a central axis. Each zone includes a multiple inlet manifold 10, from which four main collection conduits 12 extend. In one embodiment of the invention, the multiple inlet manifold 10 is a central collection hub. Thus, each zone, 52,54,56 is in turn, subdivided into four sections. In other embodiments, less than four sections or more than four sections can be provided, and the sections themselves can be of unequal sizes or be asymmetrically arrayed about the multiple inlet manifold 10. Connected to each main collection conduit 12 is a spreader conduit 14, and extending from each spreader conduit 14 are a plurality of collection laterals 16. The main collection conduit 12 and the spreader conduit 14 are preferably of approximately equal diameter, while the collection laterals 16 are of a smaller diameter than the spreader conduit 14. As illustrated in FIG. 1, the pitch of the collection laterals along the length of the spreader conduit 14 can be varied. The left hand zone 52 has a smaller pitch, and thus a higher number of collection laterals 16. The laterals in zone 52 may also have a higher number of orifices and/or larger diameter orifices than in the adjacent zones. In application, this is because this area 52 of the basin 50 accumulates sludge at a higher rate than the adjacent zones 54,56. In conjunction with the other aspects of varying the sizes and configurations of the zones, it will be readily appreciated how the geometry of the sludge collection system of the present invention can be infinitely varied to suit the conditions of the collection basin 50.

Figure 2:
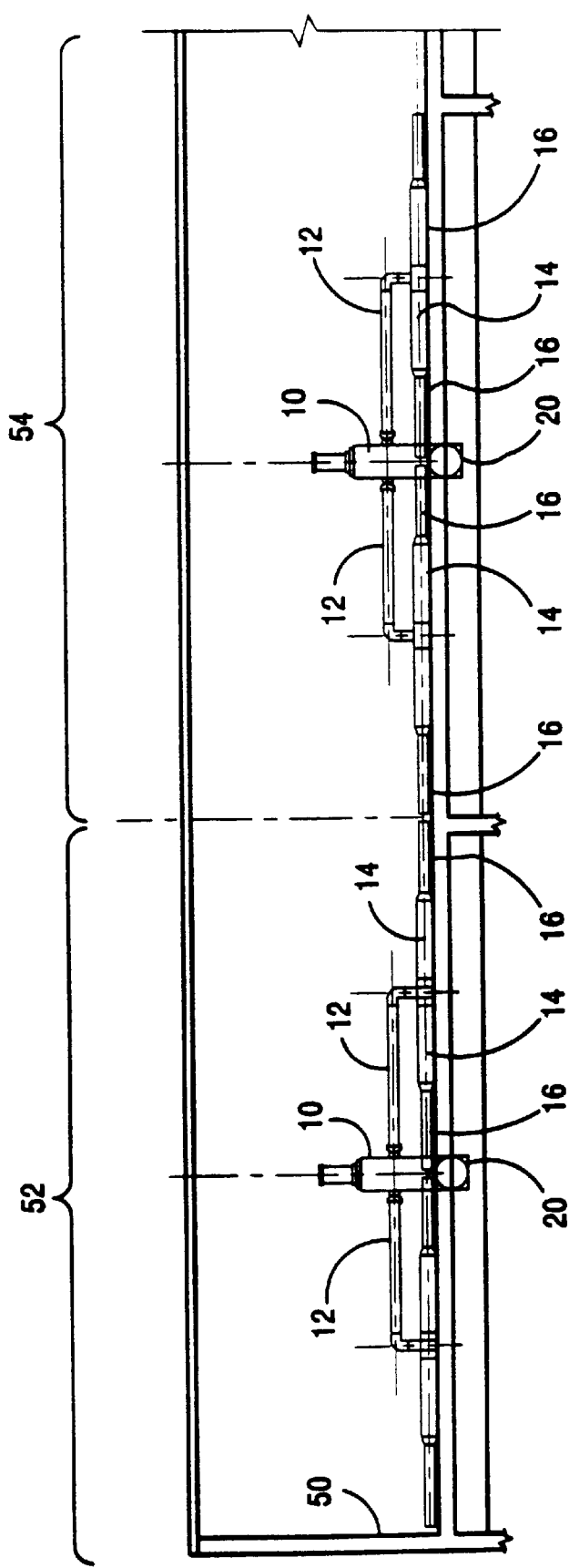
FIG. 2 is a partial side elevation view of the sludge basin and sludge collection system illustrated in FIG. 1.
Figure 2A:
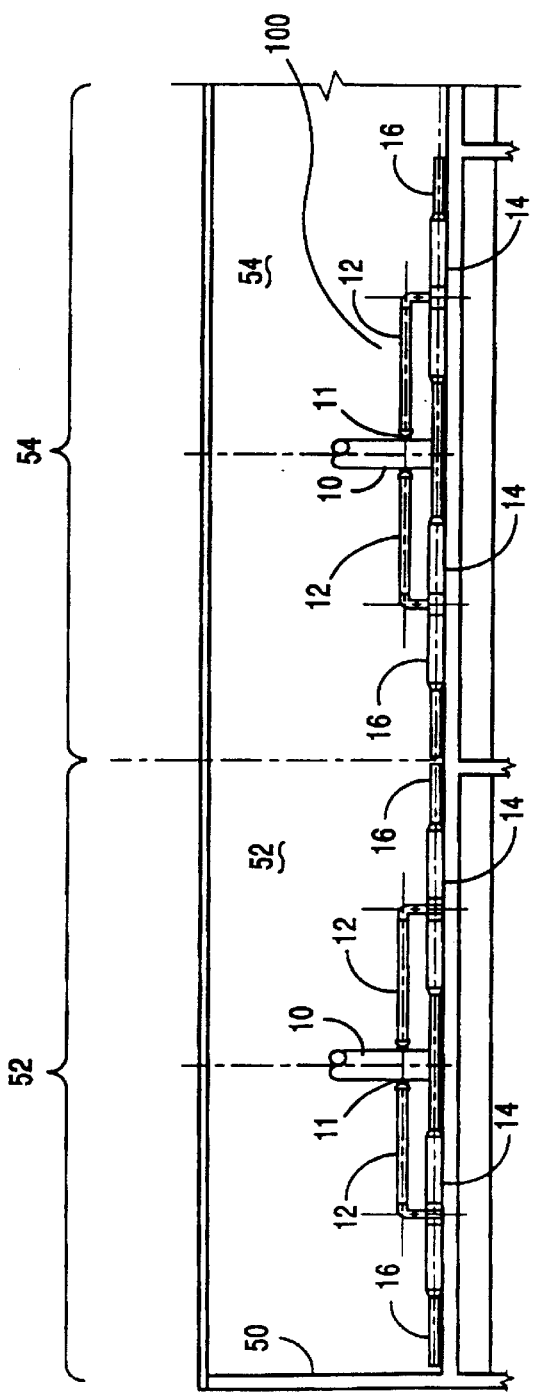
FIG. 2A is a side elevation view similar to FIG. 2 illustrating an alternate embodiment of the present invention.
Figure 3:
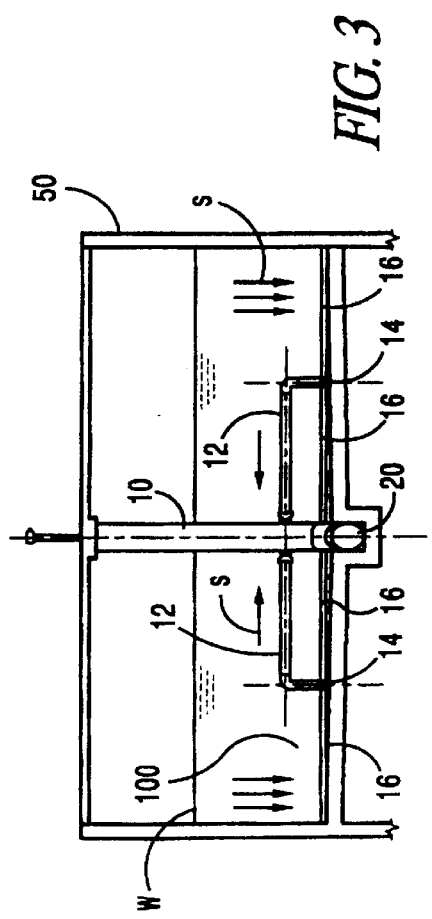
FIG. 3 is an end elevation view of the sludge basin and sludge collection system illustrated in FIG. 2A.

A side elevation view of two zones 52,54 of the sludge collection system illustrated in FIG. 1 is shown in FIG. 2. In this view it can be seen how the main collection conduits 12 and spreader conduits 14 extend from the multiple inlet manifold 10. This view further illustrates the multiple inlet manifold 10 and the main drain conduit 20 that is selectively opened in conjunction with the operation of the multiple inlet manifold 10. FIG. 2A and FIG. 3 each further illustrate one of the alternate preferred embodiments of the present invention. As shown in FIG. 2A, the manifold 10 has multiple manifold inlets 11 that provide for the flow of sludge from the main collection conduits 12 into the manifold 10. FIG. 3 is an end elevation view of the sludge collection system 100 illustrated in FIG. 2A. The drain 20, shown in FIG. 3, which is in fluid communication with the manifold outlet is a single central drain that is perpendicular to the drains illustrated in FIG. 2. The arrows, shown in FIG. 3, depict the direction of the flow of sludge S through the collection grid by means of the static head of water in the basin. The varying level of water W in the basin is also shown in FIG. 3.

The piping layout described above, in conjunction with the other aspects of the present invention set forth below, permits sludge to be collected at varying cycles. In the illustrated preferred embodiment, approximately 70% of the sludge collects in the first zone 52, and the four sections of this zone can be flushed as often as necessary, for example, once an hour. The center zone 54 collects about 20% of the sludge and needs to be flushed daily, or at another frequency usually determined empirically. Finally, since the remaining sludge gravitates to the farthest zone 56, it may be necessary to flush these four sections as infrequently as once a week. It should be understood that the cycling can be accomplished in any order, with any frequency, simply by controlling valves using known manual, semi-automatic or automatic controls. In certain embodiments, if the valves are opened and closed in a dynamic sequence, the sludge can be moved or "swept" into a particular zone or area for collection in a more efficient manner.

Those of skill in the art will realize, however, that the size, shape and location of the zones are dependent on a number of factors. The available static head of water in the basin and the available capacity of the outlet or outlets to handle the flow of sludge and water will to some extent dictate the ability of the system to be flushed, and will thus influence the number and size of the collection zones. For example, if a relatively low static head is available or if the outlets are of relatively small size, the number of zones must be greater, i.e., the area of each zone must be smaller or the number and/or size of collection orifices must be reduced. Sludge tends to settle at a greater rate in certain areas of a basin, depending upon a number of factors, including basin layout, process flow and sludge characteristics. In areas where sludge accumulates rapidly, a greater number of collection zones is preferably provided so that the overall amount of sludge that accumulates per zone is approximately equal. Similarly, the physical dimensions of the settling basin and the presence or absence of sloped floors, trenches, supporting structures and other obstructions in the basin will influence the sludge profile and will thus dictate to some extent the sizing and placement of the piping that defines the collection zones.

Figure 4:
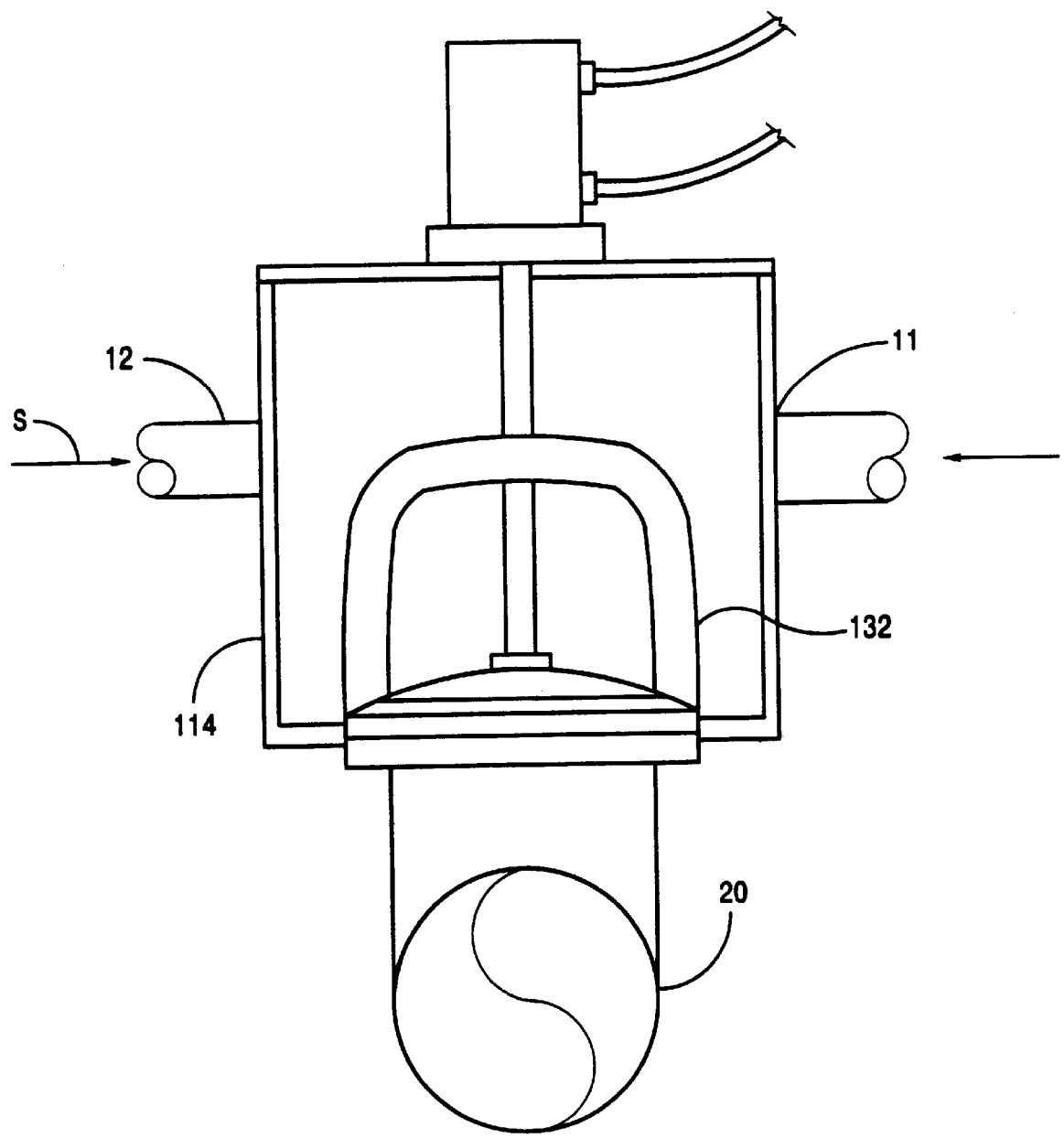
FIG. 4 is a side elevation view of a mud valve.

One aspect of the present invention is the provision of a collection valve or valves that selectively interconnect one or more of the collection zones and the drainage system. Preferably, any single zone can be drained at any given time. However, embodiments of the present invention are envisioned where more than one zone is drained at a time, or where zones are partially drained or drained in alternating sequences. For example, FIG. 4 shows one preferred embodiment that uses an actuated disc valve 132 or mud valve enclosed in a canister 114 or vessel. Transfer piping or the main collection conduits 12 from each of the sections is connected to the vessel 114, through the top or its sides, and the bottom zone of the vessel is connected to a drain pipe. With this disc valve 132, the main collection conduits 12 from all the sections of that particular zone are actuated, all at the same time, to collect sludge or not.

Figure 5A:
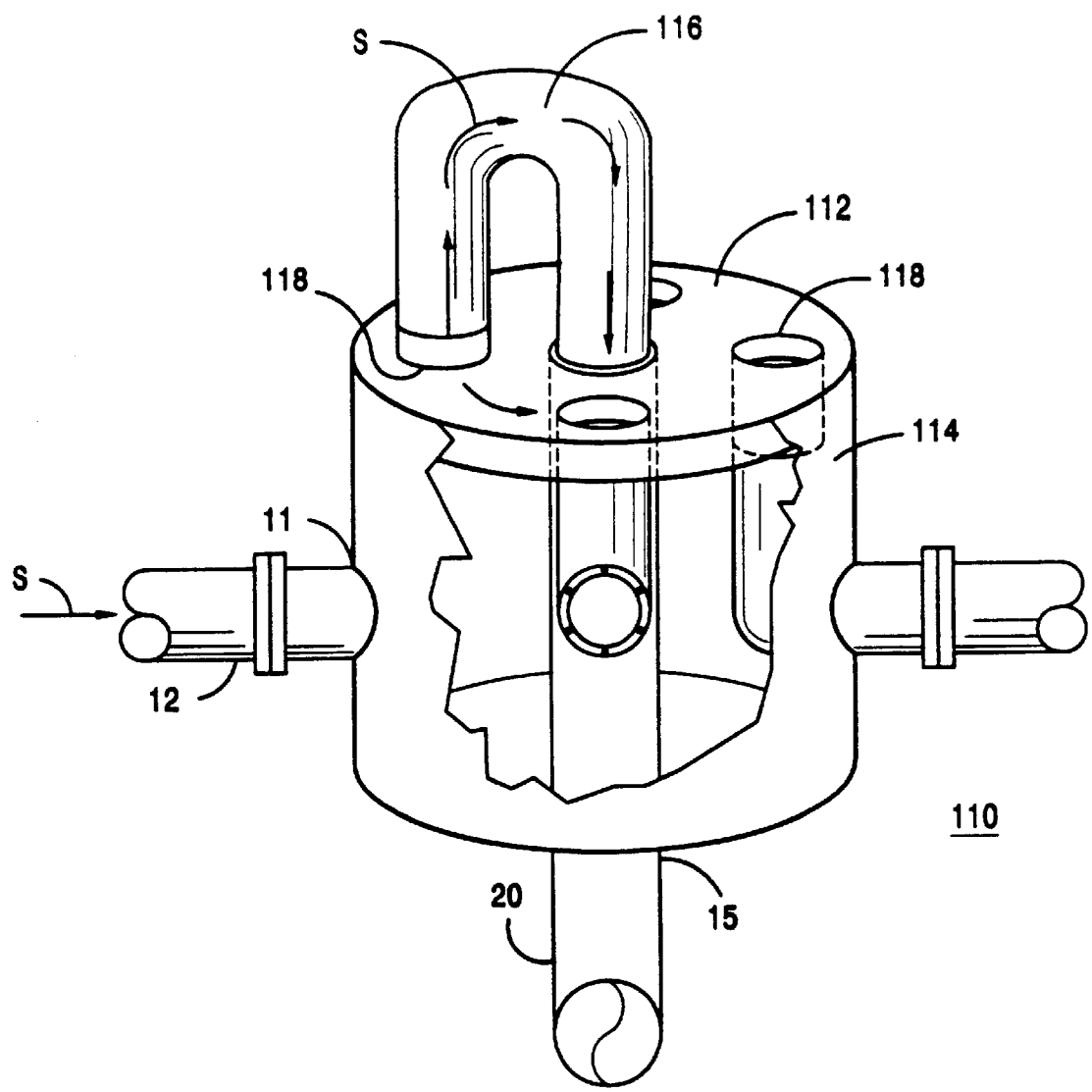
FIG. 5A is a perspective view of a multiple port valve.

FIG. 5A shows a preferred embodiment of a multiple port valve 110, illustrated as a four-port valve, for collecting sludge at one section of a zone independently from the other sections of that zone. A connecting pipe 116 is moveable between four ports 118. When the valve 110 is actuated, the static head of water pushes sludge S, along with the flushing water, through all of the interconnected sections, through the transfer piping 12, through the valve 110 and into the drain pipe 20 by means of the manifold outlet 15. The illustrated embodiment is connected to four sections and thus has four openings 118. In other embodiments, a greater number or a lesser number of sections could be serviced with a commensurate number of openings 118 being required. In certain embodiments, the connecting pipe 116 can be actuated to continuously sweep the surface of the top of the canister 114 and thus systematically pass over each of the openings 118. By varying the rate of the sweep and/or building in dwell points, the connecting pipe 116 may reside over one or more openings 118 for a set period of time. Thus, it can be appreciated that this valve design adds another degree of flexibility and selectivity to the sludge collection system of the present invention.

Figure 5B:
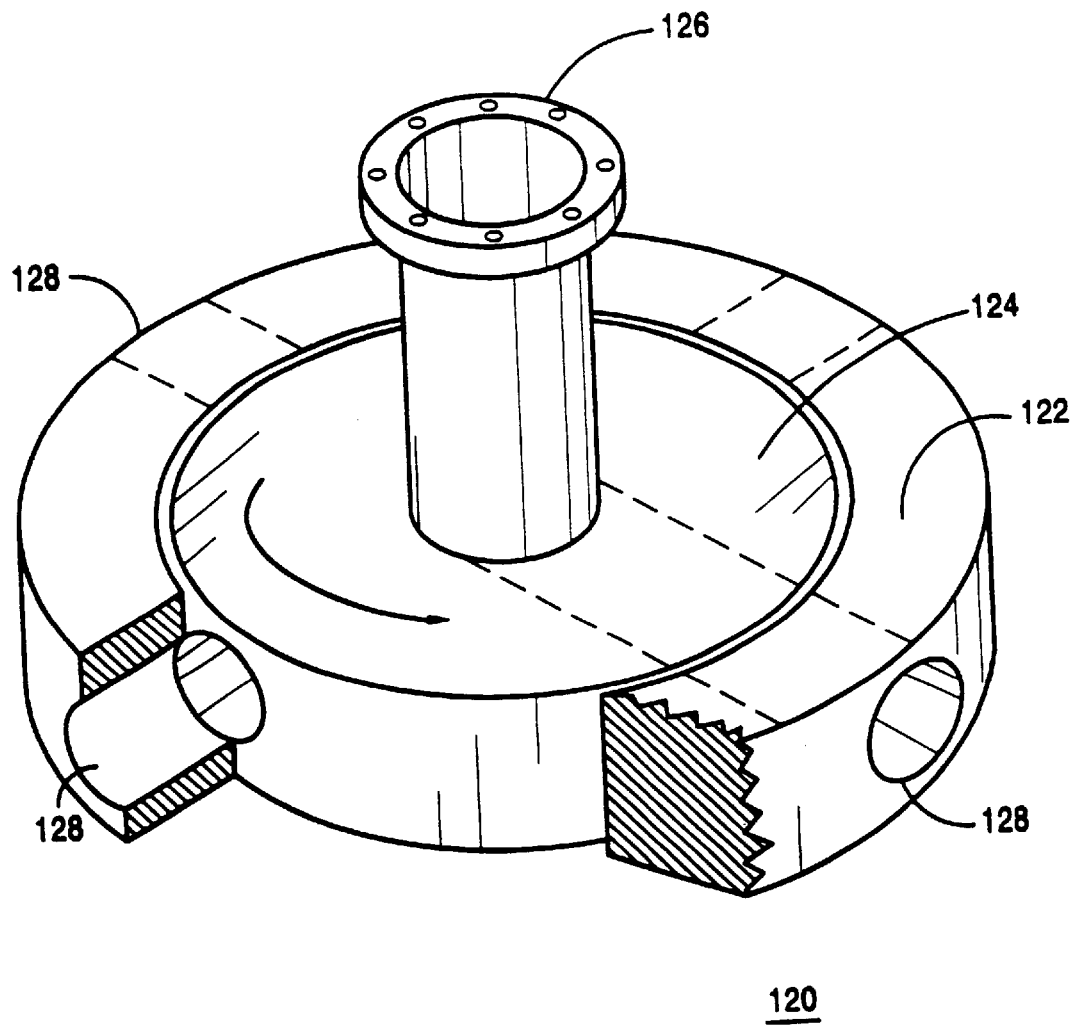
FIG. 5B is a perspective view of an alternate embodiment of a multiple port valve.

An alternate embodiment of a valve that is used in certain preferred embodiments of the present invention is illustrated in FIG. 5B. This configuration is a multiple port valve 120 and again is preferably used in collecting sludge in one section of a zone independent from the other sections of that zone. Transfer piping from each zone is connected to one of the valve ports 128, and a center port 126 is connected to a drain pipe. A rotating valve bonnet 122 rotates around the valve body 124 and at each position the bonnet 122 interconnects a different port 128, allowing sludge from each section to flow into the main drain piping (20 in FIG. 2).

In either of the preferred valve configurations illustrated and described above, air should be prevented from entering the system through the drain pipe 20. If air were to become trapped in the transfer piping, valve canister or drain piping, it would likely inhibit the flow of sludge and water and also cause excessive vibration. It is further important to slowly open and close the valves and to prevent water hammer, which could also damage the system.

As noted above, a drawback of many prior art systems is that the sludge collection systems needed to be designed and installed when the sludge collection basin was constructed. This is often difficult, and even if accomplished, over time and changing conditions, the sludge collection characteristics of the basin are likely to change. Sludge collection characteristics may change, for example, when there is a change in the chemical coagulant that is used or when there is a change in the overall flow rate of the plant. Thus, an important advantage of the present invention, in addition to the ability to selectively remove sludge from a zone, is that the piping and valving system described above can be retrofitted into existing sludge collection basins, and even after being installed, can be modified if the sludge collection parameters dictate.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed:

1. A sludge collection system, comprising:
   at least one manifold having a plurality of manifold inlets and a manifold outlet;
   a plurality of collection laterals that are in fluid communication with the manifold by way of manifold inlets;
   a drain, in fluid communication with the manifold outlet for removing sludge from the manifold; and,
   a plurality of main collection conduits connecting the collection laterals to the manifold inlets;
   said collection laterals being spaced at a defined pitch, and said collection laterals in a first zone being spaced at a first pitch and the collection laterals in a second zone being spaced at a second pitch.

2. A sludge collection system, comprising:
   at least one manifold having a plurality of manifold inlets and a manifold outlet;
   a plurality of collection laterals that are in fluid communication with the manifold by way of manifold inlets;
   a drain, in fluid communication with the manifold outlet for removing sludge from the manifold; and,
   a plurality of main collection conduits connecting the collection laterals to the manifold inlets;
   said plurality of collection laterals and said main collection conduits forming first and second zones; said plurality of collection laterals each having a diameter and a plurality of collection orifices, wherein one or more of the following is different among said first and second zones:
   the diameter of the collection laterals;

the number of collection orifices in the collection laterals; and, the diameter of the collection laterals and the number of collection orifices in the collection laterals.

3. A sludge collection system, comprising:

at least one manifold having a plurality of manifold inlets and a manifold outlet;

a plurality of collection laterals that are in fluid communication with the manifold by way of manifold inlets;

a drain, in fluid communication with the manifold outlet for removing sludge from the manifold; and, a plurality of main collection conduits connecting the collection laterals to the manifold inlets;

a plurality of sections proximate to said plurality of main collection conduits, the collection laterals each have a diameter and a plurality of collection orifices, wherein one or more of the following is different among sections:

the diameter of the collection laterals;

the number of collection orifices in the collection laterals; and, the diameter of the collection laterals and the number of collection orifices in the collection laterals.

4. A sludge collection system, comprising:

first and second sludge collection zones;

said first and second sludge collection zones each including at least one manifold having a plurality of manifold inlets and at least one manifold outlet;

said first and second sludge collections zones each having a plurality of collection laterals that are in fluid communication with the corresponding manifold by way of said manifold inlets;

a drain, in fluid communication with the manifold outlets for removing sludge from the manifolds; and, said first and second sludge collection zones each including a plurality of main collection conduits connecting the corresponding collection laterals to the corresponding manifold inlet.

5. A sludge collection system as set forth in claim 4, further including:

a sludge collection basin.

6. A sludge collection system as set forth in claim 4, wherein:

said first and second zones each having at least one spreader conduit for connecting the corresponding collection laterals to the corresponding main collection conduits.

7. A sludge collection system as set forth in claim 4, wherein:

said manifolds of said first and second zones each have a collection valve.

8. A sludge collection system as set forth in claim 7, wherein:

said collection valve selectively permits flow of sludge from the collection laterals through the manifold inlets and through the manifold.

9. A sludge collection system, comprising:

first and second collection zones; said first and second collection zones each having a manifold, said manifold having a plurality of manifold inlets and at least one manifold outlet;

said first and second collections zones each having a plurality of collection laterals, said collection laterals each having an outlet, said outlets of said collection laterals being free of any valving;

a drain, in fluid communication with the manifold outlets for removing sludge from the manifolds; and, said first and second zones each including a plurality of main collection conduits in fluid communication with the corresponding outlets of the collection laterals.

10. A sludge collection system, comprising:

first and second collection zones;

said first and second collection zones each including at least one manifold having a plurality of manifold inlets and at least one manifold outlet;

said first and second collections zones each having a plurality of collection laterals that are in fluid communication with the corresponding manifold by way of said manifold inlets, said plurality of collection laterals being elongated pipes;

a drain, in fluid communication with the manifold outlets for removing sludge from the manifolds; and, said first and second zones each including a plurality of main collection conduits connecting the corresponding collection laterals to the corresponding manifold inlet.

11. A sludge collection system, comprising:

at least one manifold having a plurality of manifold inlets and a single manifold outlet;

a plurality of collection laterals that are in fluid communication with the corresponding manifold by way of said manifold inlets;

a drain, in fluid communication with the manifold outlet for removing sludge from the manifold; and, at least first and second main collection conduits connecting the collection laterals to the manifold inlets, said first main collection conduits being operable independent of said second main collection conduit such that sludge may simultaneously pass through said first main collection conduit and said second main collection conduit and to said drain.

12. A sludge collection system as set forth in claim 11, wherein:

said collection laterals are elongated pipes.

* * * * *

UNITED STATES PATENT AND TRADEMARK OFFICE
CERTIFICATE OF CORRECTION

PATENT NO. : 6,354,328
DATED : March 12, 2002
INVENTOR(S) : R. Lee Roberts

It is certified that error appears in the above-identified patent and that said Letters Patent is hereby corrected as shown below:

<u>Title page,</u>
Item [63], insert the following paragraph:

The subject patent application is a continuation of U.S. Patent Application Serial No. 09/244,724 filed on February 4, 1999 and which issued on April 4, 2000 as U.S. Patent No. 6,045,709 which in turn is a divisional of U.S. Patent Application Serial No. 08/881,318 filed on June 25, 1997 and which issued on June 15, 1999 as U.S. Patent No. 5,911, 241.

<u>Column 8,</u>
Line 46, delete "first main collection conduits" and insert the following:

-- first main collection conduit. --

Signed and Sealed this

Seventh Day of May 2002

Attest:

Attesting Officer

JAMES E. ROGAN
Director of the United States Patent and Trademark Office